(12) United States Patent
Smoot (10) Patent No.: US 9,958,749 B2
(45) Date of Patent: May 1, 2018

(54) OPTICAL ASSEMBLIES THAT ARE BOTH BRIGHTLY BACKLIT AND TRANSPARENT FOR USE IN COSTUMED CHARACTERS

(71) Applicant: DISNEY ENTERPRISES, INC., Burbank, CA (US)

(72) Inventor: Lanny S. Smoot, Thousand Oaks, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 79 days.

(21) Appl. No.: 15/262,287

(22) Filed: Sep. 12, 2016

(65) Prior Publication Data

US 2018/0074351 A1    Mar. 15, 2018

(51) Int. Cl.
| G02F 1/137 | (2006.01) |
| G02F 1/1334 | (2006.01) |
| G02F 1/1335 | (2006.01) |
| A42B 3/04 | (2006.01) |

(52) U.S. Cl.
CPC .............. *G02F 1/137* (2013.01); *A42B 3/042* (2013.01); *G02F 1/1334* (2013.01); *G02F 1/133603* (2013.01); *G02F 2001/13756* (2013.01)

(58) Field of Classification Search
CPC .. G02F 1/137; G02F 1/1334; G02F 1/133603; G02F 2001/13756; A42B 3/042
See application file for complete search history.

(56) References Cited

U.S. PATENT DOCUMENTS

| 4,400,725 A | 8/1983 | Tanigaki |
| 4,890,314 A | 12/1989 | Judd et al. |
| 4,928,301 A | 5/1990 | Smoot |
| 9,298,007 B2 | 3/2016 | Border |
| 9,377,625 B2 | 6/2016 | Border et al. |
| 9,401,540 B2 | 7/2016 | Osterhout et al. |
| 2015/0205126 A1* | 7/2015 | Schowengerdt .......... G06T 7/73 345/633 |
| 2016/0125653 A1* | 5/2016 | Denis ..................... B23K 9/322 348/90 |
| 2016/0187650 A1* | 6/2016 | Mills ...................... A42B 3/042 345/8 |
| 2017/0176818 A1* | 6/2017 | Shi .................... G02F 1/134309 |

FOREIGN PATENT DOCUMENTS

| JP | 62258574 A | 11/1987 |
| JP | 63102483 A | 10/1988 |

* cited by examiner

*Primary Examiner* — Kevin Quarterman
(74) *Attorney, Agent, or Firm* — Marsh Fischmann & Breyfogle LLP; Kent A. Lembke (57) ABSTRACT

An apparatus worn as headgear providing visual effects and vision to the wearer. The apparatus includes a shell or helmet. The apparatus includes an optical assembly mounted in the interior space of the shell adjacent eye slits or opening(s) to the interior space of the shell. The optical assembly includes an outer screen (e.g., a film of polymer-dispersed liquid crystal) switchable between a rear projection (RP) screen state in which the outer screen is cloudy or translucent and a transparent state. The optical assembly includes a backlighting assembly with numerous lights. The optical assembly includes a controller switching, at a rate greater than the flicker fusion rate, between a first operating state with the outer screen in the RP screen state and the lights on to illuminate the outer screen and a second operating state with the outer screen in the transparent state and the lights off.

22 Claims, 9 Drawing Sheets

OPTICAL ASSEMBLIES THAT ARE BOTH BRIGHTLY BACKLIT AND TRANSPARENT FOR USE IN COSTUMED CHARACTERS

BACKGROUND

1. Field of the Description

The present description relates, in general, to vision or optical assemblies for use in costumes for characters and for use in other headgear such as helmets and the like worn by theatrical performers, sold as toys and as collector items, and the like. More particularly, the present description relates to a special effect and vision-enabling assembly for use in headgear (and such headgear including this assembly) such as a head, helmet, or mask for a character at an event or theatrical setting, for a toy or collector helmet or mask, or any other headgear in which it is desirable to provide a special or visual effect where the "eyes" or eye-shield(s) (e.g., outward facing portion(s)) of the assembly projects or transmits bright light and in which it is concurrently desirable to allow the wearer of the headgear to have relatively clear and/or unobstructed vision through the "eyes" or eye-shield(s).

2. Relevant Background

There are numerous settings where headgear is utilized where it is desirable not only to allow the person wearing the headgear to have good vision but also to use the headgear to provide some specific visual or special effect. For example, a toy or collector helmet may be adapted to simulate a particular superhero from a comic book or movie, and this superhero may have a helmet with a shield over the eyes that emits or projects light or has some other specific visual quality (e.g., bright red or other colored eyes) to observers. When a person wears such a toy or collector helmet, it is also desirable that they be able to see out of the helmet to be able to safely walk around while "being" the superhero.

In another example, a performer may wear headgear in the form of a head or helmet that simulates a character, and the character's eyes may glow or shine with white or colored light. Specifically, costumed characters may require that the performers wear masks or helmets where the eye areas emit bright, vibrant light. In some cases, the eye area of the mask or helmet may also be adapted to be optically "flat" as well as opaque from the outside so that the performer's eyes and face remain hidden to observers of the costumed character. These costumed characters are staffed or provided by human performers who must at the same time as the visual effect is provided in the eye area of the mask be able to see through their head-mounted helmet or mask so that they can navigate their surroundings and interact with the observers and other performers.

It has often proved difficult to concurrently provide visual effects and proper vision for the wearer of such headgear. In the costumed character setting, one solution is to rely on holes in the masks or helmets to try to get enough of a view of their surroundings outside their mask or helmet to allow them to safely and effectively maneuver. However, this often results in a very limited outside view, and the holes may not coincide with the "eyes" of the helmet or mask, which can cause the performer to move their head in a less natural manner.

Another solution that has been implemented is the use of a display system within the headgear that involves the use of one or more cameras capturing images of the space outside the headgear and a heads-up internal display displaying these captured images to the person wearing the helmet or mask. These can be expensive and complex to implement and also be relatively bulky so as to only be suited for relatively large "heads." Further, the performer may be left with a non-stereo view with no depth sensing and with a distorted perspective gathered from the camera's point of view (POV) rather than their own.

SUMMARY

Briefly, headgear is described that includes an assembly that is specially adapted to provide unique visual effects while also providing a wearer of the headgear with a clear view through the headgear. The headgear may take many forms such as a helmet or mask that would be worn by a performer at an event or theater to provide a particular character or a toy or collector helmet or mask used to simulate a superhero or other character. The assembly may be considered a special effects and vision assembly as the eye piece(s) or shield(s) (or outer screen) can be brightly backlit to emit a white or colored light and also to be transparent to allow the wearer to be able to see through the eye piece or shield to directly view or see their surroundings. The new assembly, thus, eliminates the need for cameras and a heads-up display to provide the vision functionality for the headgear, which is far simpler and less expensive to implement, provides the wearer with a normal view of the world without camera and display distortions or visual lag, and has a much smaller form factor.

Briefly, the special effects and vision assembly includes a sheet of polymer-dispersed liquid crystal (PDLC) material to provide its outer screen (or its eye piece or shield). The PDLC outer screen is outward or observer-facing, and the assembly further includes a backlighting assembly, positioned inward from the outer screen in the assembly, to illuminate or backlight the inside of the PDLC outer screen to cause the PDLC outer screen to emit a bright white or colored light. The backlighting assembly may take the form of one-to-many powerful LED lights that can be strobed to selectively provide the backlighting. The PDLC material is utilized for the outer screen or eye shield/piece(s) because it has the rather unique capability of being electrically switchable between a clear or transparent state and an optically diffuse or cloudy state within milliseconds such that the switching can easily occur in the 30 to 60 Hertz range to avoid flicker (or to avoid being noticed by the wearer of the headgear with the assembly or by an outside observer of the operating headgear).

The special effects and vision assembly further includes a controller or control assembly, and, during operations of the special effects and vision assembly, the PDLC outer screen is switched to its diffuse state by the controller while the controller turns on (or switches on) the helmet-mounted LEDs (or backlighting assembly). From the outside of the headgear, the PDLC outer screen now (during this first operating state of the assembly) appears to be brightly lit and quite opaque. The special effects and vision assembly includes a shutter assembly positioned further inward from the backlighting source (toward a location of the wearer's eyes). In the first operating state of the assembly, the controller controls the shutter assembly to "close" to protect the wearer's eyes from backward reflected light (or glare) from the LEDs/backlighting assembly's lighting of the PDLC outer screen. The shutter assembly may be provided in the form of a sheet of a second type of liquid crystal (or an LC shutter) that is adapted to be switched from an opaque state (shutter closed state used in the first operating state) to a transparent or clear state. The controller operates the shutter assembly and its LC shutter to be in the opaque state when the PDLC outer screen is being backlit so as to shield the performer's eyes.

During a second cycle of operation or second operating state or phase (e.g., Phase 1 and Phase 2) that is alternated over time with the first operating state (e.g., at a 24 to 60 Hz or faster switching or cycling rate), the PDLC outer screen is made clear by the controller (e.g., is switched from the opaque state to the transparent/clear state (or at least translucent state)). Concurrently, the backlighting assembly (and its LEDs) is switched or turned off by the controller. Further, the controller opens the shutter assembly by making the LC shutter transparent (switching from the opaque state to the transparent (or at least translucent) state). In this second operating state of the special effects and vision assembly, the assembly is transparent such that a wearer of the headgear with the assembly has a forward view of their surroundings.

The controller is configured to alternate between these two cycles or operating states faster than the so-called "flicker fusion" rate (e.g., the rate of shuttering becomes imperceptible). To this end, the switching may occur at a rate in the range of 24 to 60 Hz or faster. From the outside observer's viewpoint, the eye area of the headgear (e.g., characters eyes or a shield over a character's eyes) will appear to be solidly and/or continuously emitting light and to be opaque such that the person wearing the headgear is hidden from view. To the person wearing the headgear (e.g., a performer wearing a costume that includes a helmet or mask), the view through the vision assembly will appear to be continuously clear or transparent with no view of the flashing lights/LEDs of the backlighting assembly.

More particularly, an apparatus is described for use as headgear (e.g., a helmet or the like worn by a performer or used as a toy or collector's item) providing visual effects (e.g., an apparently brightly lit and opaque eye shield(s) providing a wearer of the headgear clear vision). The apparatus includes a shell with an interior space for receiving a person's head, and the shell includes at least one opening to the interior space (e.g., a single eye hole or slit or a pair of eye holes). The apparatus also includes an optical assembly mounted in the interior space of the shell adjacent the opening(s) to the interior space. The optical assembly includes an outer screen switchable between a rear projection (RP) screen state (in which the outer screen is cloudy or translucent-to-opaque) and a transparent state. The optical assembly also includes a backlighting assembly with a plurality of lights switchable between a first state with the lights powered on and a second state with the lights powered off. Further, the optical assembly includes a controller switching between operating the optical assembly in a first operating state with the outer screen in the RP screen state and the backlighting assembly in the first state to illuminate a rear surface of the outer screen with light from the lights and in a second operating state with the outer screen in the transparent state and the backlighting assembly in the second state to allow light to pass through the outer screen into the interior space of the shell.

In some embodiments, the switching by the controller is performed at a rate greater than 24 Hertz (Hz) such as in the range of 30 to 60 times per second. The outer screen in some preferred embodiments is a piece or film (or sheet) of polymer-dispersed liquid crystal (PDLC) material (e.g., fast PDLC window film or the like). In some implementations, the backlighting assembly further includes an opaque support panel with a first surface facing the outer screen and a second surface facing the interior space of the shell, and the lights are mounted on the first surface about the periphery of at least one opening in the support panel (with the opening(s) providing a pathway for the light passing through the outer panel to reach the interior space of the shell). In such implementations, the lights may each be a light emitting diode (LED) such as a colored LED or a white LED.

In the same or other embodiments, the optical assembly further includes a shutter assembly to protect the wearer's eyes from glare during the first operating state. Particularly, the backlighting assembly may be disposed between the shutter assembly and the outer screen, and the shutter assembly may include a shutter switchable between a dark or opaque state and a transparent state. During use or operations, the controller operates the shutter in the dark or opaque state during the first operating state of the optical assembly and in the transparent state during the second operating state. In some specific cases, the shutter may include or be a sheet(s) of liquid crystal (LC) material that is placed over (or covering) the openings in the support panel of the backlighting assembly.

DETAILED DESCRIPTION OF THE PREFERRED EMBODIMENTS

Briefly, a special effects and vision assembly is described for use in headgear such as a head, helmet, or mask worn by a performer at an event or as part of a costume. The new assembly allows the performer to have a clear view of their surroundings through an outer screen or eye shield (or eye pieces) and "concurrently" backlighting the outer screen or eye shield to provide a special effect such as by making the eye shield or outer screen appear to be opaque and to emit a bright white or colored light. These two functions are perceived as being provided concurrently and continuously but, in practice, a controller is used to switch the operations of the assembly between two operating states, modes, or phases in a rapid manner (e.g., about the fusion rate or in the range of 24 to 60 Hz or faster) such that the switching is not perceived by the wearer of the headgear or by a person observing the headgear from the outside.

Figure 1A:
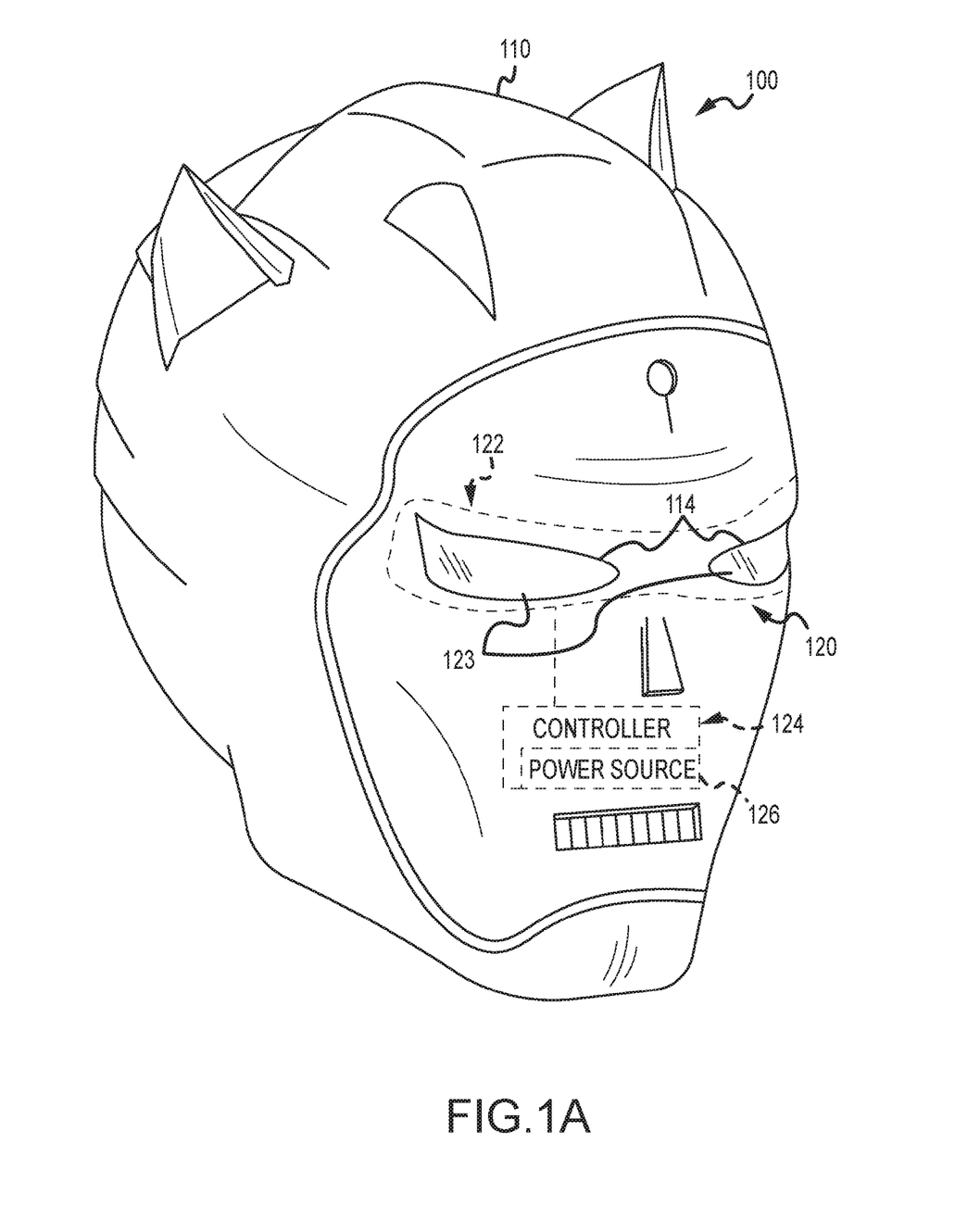
FIGS. 1A-1C show headgear (e.g., a character's helmet, mask, or head) including a special effects and vision assembly with FIGS. 1B and 1C showing the special effects and vision assembly operating in its two operating states, modes, or phases (e.g., a light emitting mode and a see-through mode)
Figure 1B:
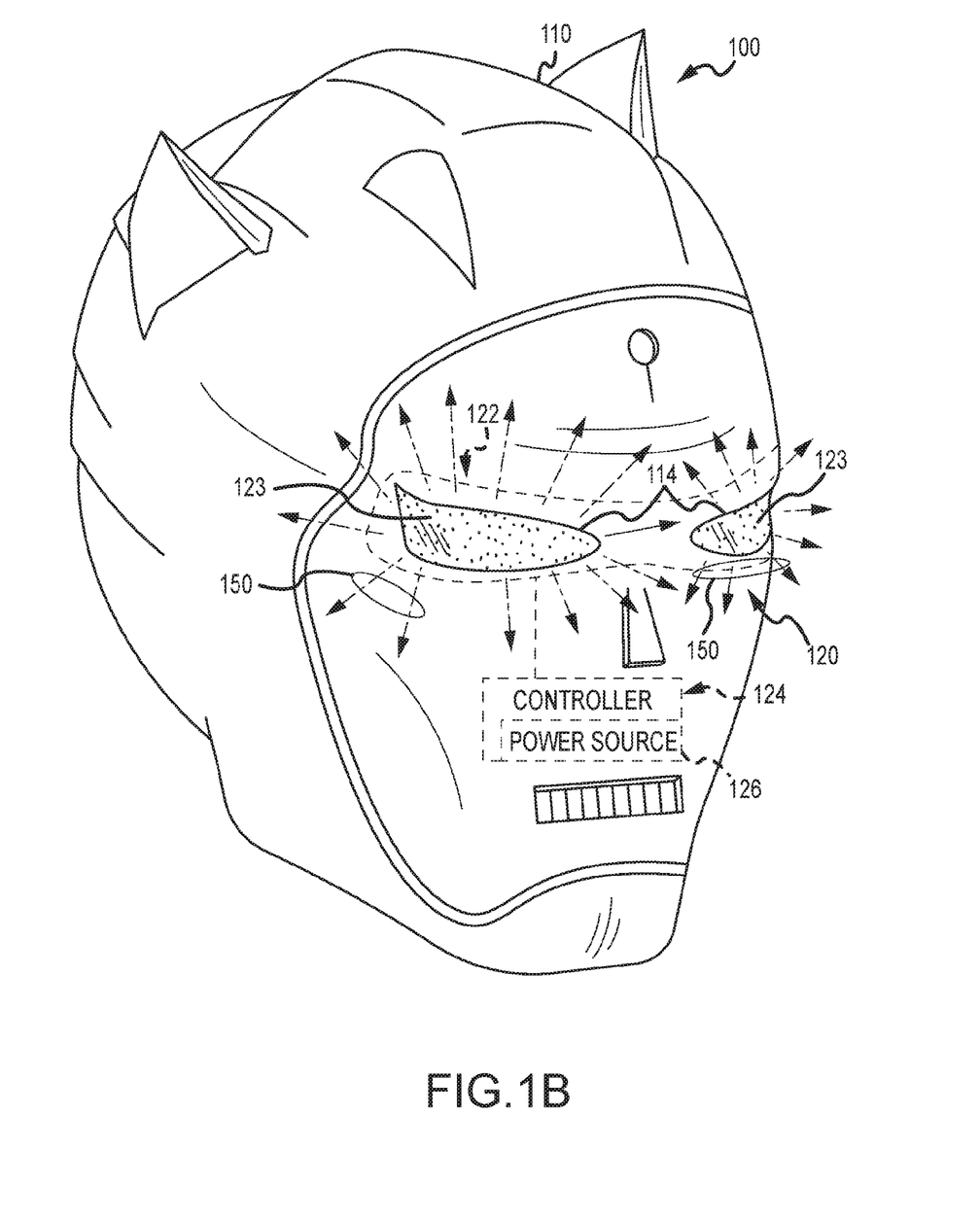
Figure 1C:
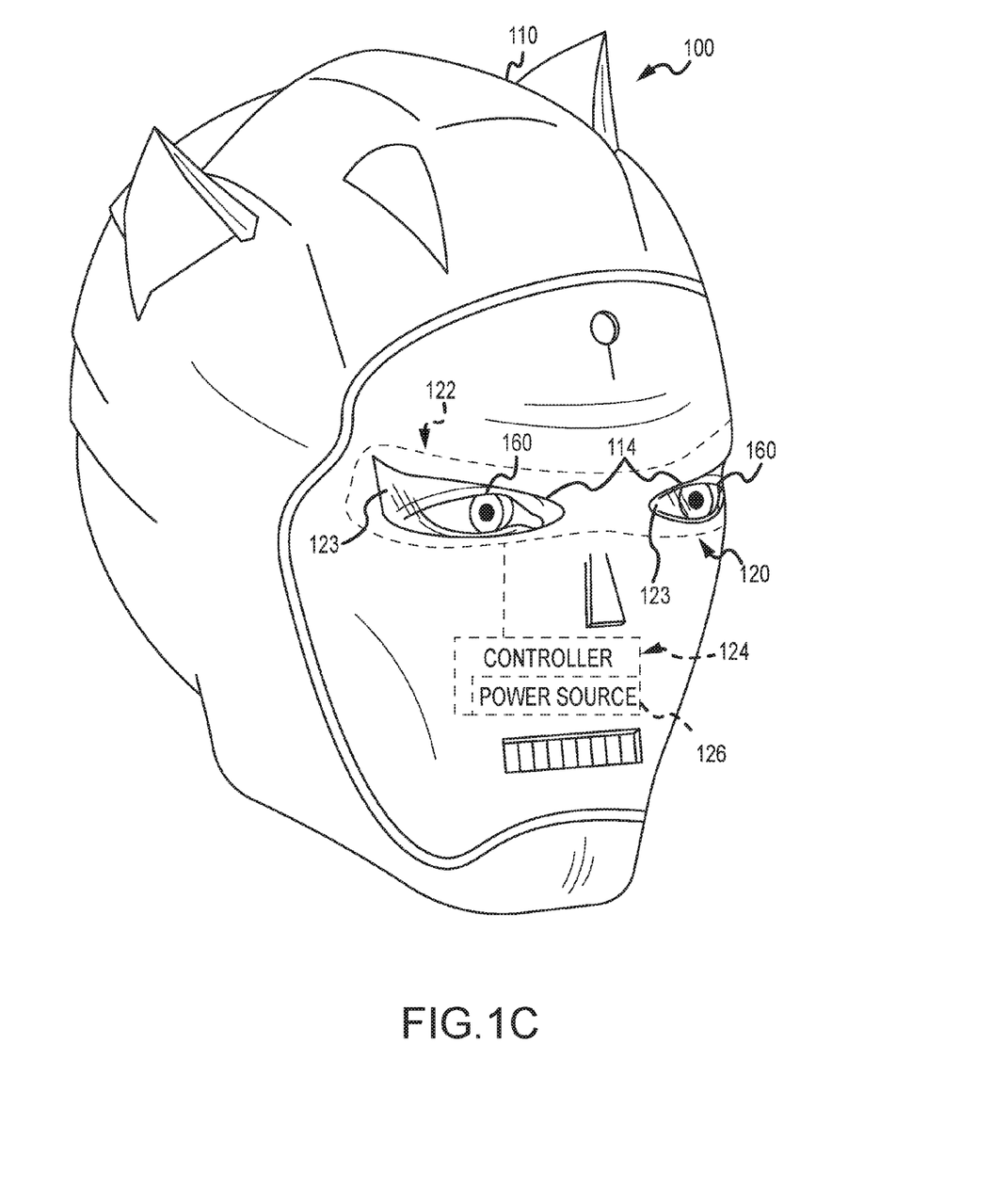

FIG. 1 illustrates headgear 100 (e.g., a helmet in this non-limiting example) with a special effects and vision assembly 120. The headgear may be worn by a person (e.g., a performer, a toy purchaser, a collector, and the like) during operations of the assembly 120 to provide special or visual effects (as seen in FIG. 1B) and to provide the wearer with a clear view of outside the headgear (as seen in FIG. 1C). The headgear 100 includes an outer shell 110 adapted for receiving a wearer's head (not shown). The outer shell 110 includes a pair of viewing ports or eye openings 114 (but a single opening for both wearer's eyes could be used in some implementations), and the ports/openings 114 typically are provided simply as a void in or absence of the material (which is typically opaque) of the shell 110. These holes or openings 114 provide pathways for light to pass outward from the inner spaces of the shell 110 and for light to pass inward from the surrounding spaces into the inner spaces of the shell 110 (e.g., to a wearer's eyes).

The shell 110 is used to support the special effects and vision assembly 120 within its interior space and, particularly, with a subassembly 122 including an outer screen or eye shield 123 positioned behind or adjacent the viewing ports or eye openings 114. As is explained below, the subassembly 122 generally includes a shutter assembly for protecting the wearer's eyes and a backlighting assembly for backlighting the outer screen 123 in addition to the outer screen 123. The assembly 120 further includes a controller (or control circuit/assembly) 124 supported within the shell 110 and linked/wired to the subassembly 122 (or its components including the outer screen 123) to provide power with power sources 126 (e.g., one or more batteries) and/or control signals to selectively operate these components and switch between first and second operating modes or phases.

In this regard, FIG. 1B illustrates the headgear 100 when the assembly 120 is operating in the first operating state (e.g., the emitting mode) while FIG. 1C illustrates the headgear when the assembly 120 is operating in the second operating state (e.g., the see-through mode). In the emitting mode/operating state of FIG. 1B, the controller 124 operates to place the outer screen 123 in its emitting or rear projection screen state (e.g., to switch one or two sheets or pieces of PDLC material to its cloudy or translucent state) and to operate the backlighting assembly to illuminate or backlight the back or inner surfaces of the outer screen 123, which causes light 150 to be emitted from the front or outer surfaces of the outer screen 123. The outer screen 123 appears opaque in this state and the lights/LEDs of the backlighting assembly are not visible (as shown in FIG. 1B) from an observer of the headgear 100. In the first or light-emitting mode, the controller 124 also acts to switch the shutter assembly of the subassembly 122 to a closed state (close the shutter) such as by making a sheet of LC material opaque, and this protects eyes of a person wearing the headgear 100 from glare or reflection of light from the outer screen 123.

FIG. 1C illustrates the headgear 100 when the assembly 120 is operating in the second operating state (e.g., the see-through or transparent mode). In the see-through or transparent mode/operating state of FIG. 1C, the controller 124 operates the shutter assembly of subassembly 122 of the assembly 120 to open such as by making or switching the LC material to be transparent. The controller 124 further operates to turn off the backlighting assembly of subassembly 122 to halt illumination of the outer screen 123. Additionally, the controller 124 acts to concurrently operate the outer screen 123 to switch from its translucent or rear-projection state to its transparent or light-transmissive state. For example, the PDLC material of the screen 123 may be switched into a transparent mode by controller 124 during the second operating state or mode. This results in the subassembly 122 including the outer screen 123 being transparent and providing a clear pathway for light from outside the shell 110 to reach the wearer's eyes 160, which allows the wearer of the headgear 100 to be able to see their surroundings without (or with minimal) obstruction and without the need for a camera and heads-up display.

In practice, the controller 124 acts to switch back and forth between the first and second operating states as shown in FIGS. 1B and 1C at a rate in the range of 24 to 60 Hz (or a greater rate). This switching speed is useful because it is above the flicker fusion rate for both the outside observer of the headgear 100 and the wearer of the mask (for eyes 160 shown in FIG. 1C). In this way, outside observers perceive the headgear 100 to be continuously in the first operating mode of FIG. 1B with the outer screen 123 emitting light 150 while "concurrently" or over the operations of the assembly 120 the wearer of the headgear 100 perceives the headgear 100 to be continuously in the second operating mode of FIG. 1C with the outer screen 123 and other portions of the subassembly 122 (including the shutter assembly) to be transparent or clear (e.g., they do not perceive the light from the backlighting assembly).

Figure 2:
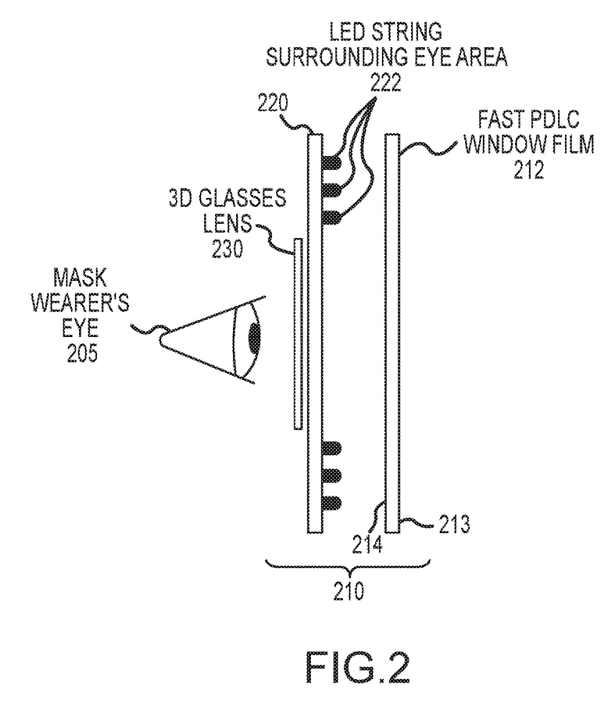
FIG. 2 is a side view of an exemplary embodiment of a special effects and vision assembly of the present description such as may be used in headgear such as the helmet of FIGS. 1A-1C (with one of the mask wearer's eyes being shown next to the shutter or shutter assembly)

FIG. 2 illustrates one useful embodiment of a special effects and vision assembly (or optical assembly) 210 for use in headgear, such as the helmet 100 shown in FIGS. 1A-1C. Although not shown in FIG. 2, the assembly 210 would be powered and controlled by a controller that would also, typically but not always, be included in the headgear (such as controller 124 shown in FIGS. 1A-1C or controllers 400, 500, and 600 of FIGS. 4-6). FIG. 2 is a side or end view of the assembly 210 showing the components of the assembly 210 and a person's (a person wearing the headgear) eye 205 is shown in a position relative to the assembly 210 that would occur when the headgear with the assembly 210 were in use with the eye 205 proximate (e.g., with 0.5 to 3 inches or the like) to the rear of the assembly 210 (e.g., near to the shutter assembly 230).

As shown, the assembly 210 includes an outer screen (or eye shield(s)/pieces) 212 with an outer surface 213 facing outward such as to a space exterior to headgear in which the assembly 210 is included and an inner surface 214 opposite the outer surface 214 that faces inward into the interior space of the headgear and toward the wearer's eye 205. The outer screen 212 is adapted for rapid switching between a first operating state or mode, in which it can be used as a rear projection screen or to emit light from its outer surface 213 when its rear surface 214 is illuminated, and a second operating state or mode, in which it can act as a window to allow light to pass through to the wearer's eye 205 (to the interior space of the headgear).

Hence, it is desirable that the outer screen 212 be formed of a material that is translucent (e.g., cloudy or translucent to opaque) when operated in the first operating state or mode and transparent (which may mean transparent to less translucent than in the first operating state or mode) in the second operating state. In one preferred embodiment, the outer screen 212 is formed of a sheet or piece of PDLC material (or a fast PDLC window film). PDLC (or polymer-dispersed liquid crystal) is useful as the screen 212 because it has the capability of being electrically switched from an optically diffuse/cloudy state (rear projection state/mode) to a clear state in milliseconds such that it can support switching between the first and second operating states or modes at a rate that is greater than 24 Hz such as at a rate in the range of 30 to 60 Hz to avoid flicker.

The special effects and vision assembly 210 also includes a backlighting assembly made up of a support platform or panel 220 and a plurality of lights 222. The support panel 220 may be formed of a relatively rigid material such as from a thin sheet of plastic. The panel 220 may be planar or arched to suit the headgear (e.g., with a radius often found in helmet shields or goggles) and often is formed as a ring (e.g., an oval) or pair of rings (which may be interconnected to form a figure-8 shape or be separate rings) to provide a single hole or two holes or openings for light to pass through to the wearer's eye(s) 205 (or the interior space of the headgear) after passing through the outer screen 212 when it is switched to the clear state or second operating state/mode. The panel 220 is also opaque so that when the lights 222 are illuminated the light they produce does not pass through the panel 220 (e.g., after reflecting off of the surface 214 or other surfaces of the headgear).

As shown, the lights 222 are placed on the side or surface of the panel 220 that faces the inner surface 214 of the outer screen 212. In this way, the lights 222, when turned on in the first operating state of the assembly 210, act to illuminate the inner or rear surface 214 of the outer screen. This causes the outer surface 213 to emit light. The lights 222 typically are stringed together electrically such that they are turned on and off as a group. In some embodiments, the lights 222 are provided as a string of light emitting diodes (LEDs), and these LEDs may be chosen to be white or one or more colors to emit a desired light from the surface 213 of outer screen 212 (e.g., to achieve a desired special or visual effect with the assembly 210). In some embodiments, the LEDs (e.g., LED strip lights) are chosen to be bright with a relatively high illumination rating/capacity, and the number used may vary widely to practice the assembly 210 (e.g., 1 to 50 or more). The spacing between the surface 214 and adjacent surface of panel 220 may also be varied, with a spacing of 0.125 to 1 inch being useful in many embodiments.

The optical assembly 210 further includes a shutter assembly 230 to protect the wearer's eye 205 from glare during the first operating state/mode of the assembly 210. The shutter assembly 230 functions to be closed or to be opaque when the lights 222 are turned on and the outer screen 212 is cloudy/translucent and to be open or transparent/clear when the lights 222 are turned off and the outer screen 212 is transparent/clear. To this end, the shutter assembly 230 was prototyped using lenses of 3D glasses that can be rapidly switched between an opaque state and a transparent state. More generally, the shutter assembly 230 may be provided with one or two pieces or sheets (e.g., that may take a form similar to lenses of glasses or a shield of a pair of goggles if the hole in the platform is a single large oval) of LC material that is switchable between an opaque state and a transparent state at a rate of 24 Hz or more. The LC material may be shaped and sized to cover the holes/openings in the support panel 220 so as to block light during the light-emitting or first operating state of the assembly 210, and the shutter pieces may be attached directly (or indirectly) to the back or inner surface/side of the panel 220.

Figure 3A:
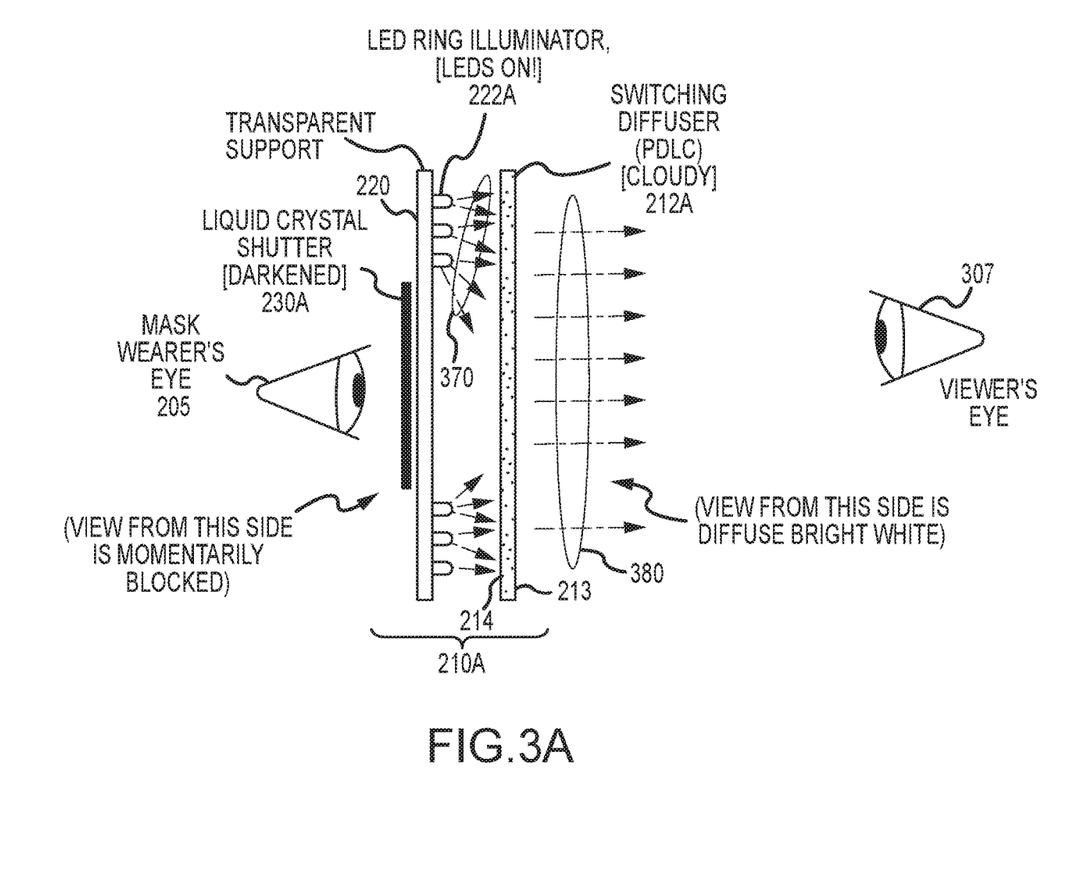
FIGS. 3A and 3B show, respectively, side views of the special effects and vision assembly of FIG. 2 during operation of a controller (not shown) to operate the assembly in a first operating mode or state (e.g., the light-emitting mode) and to operate the assembly in a second operating mode or state (e.g., the see-through or clear mode)
Figure 3B:
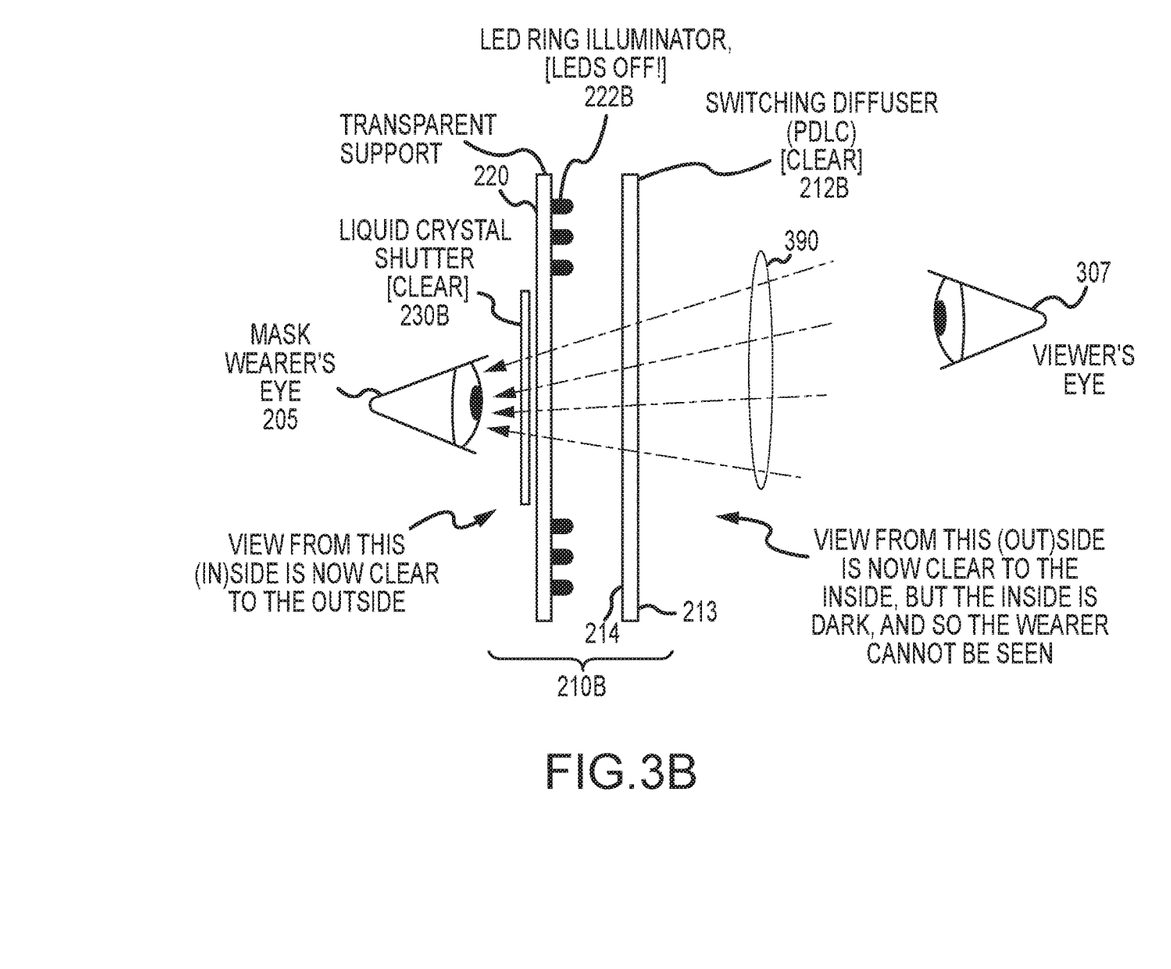

FIGS. 3A and 3B illustrate, respectively, the assembly 210 during its operations (by a controller not shown but in the form shown in FIG. 1A-1C or 4-6) in a first operating state/mode (e.g., a light-emitting mode) and a second operating state/mode (e.g., a see-through or vision-enabled mode). An eye 307 of an outside observer or viewer is shown to illustrate what they would perceive during the operation of the assembly 210, and, significantly, this differs from what is perceived by the person wearing headgear with the assembly 210 with their eye 205.

Specifically, FIG. 3A illustrates the assembly 210A operating in the light-emitting mode or first operating state/mode. In this state, the outer screen 212A is operated in a first state in which it is cloudy (translucent to opaque) such that it acts as a rear projection screen. Concurrently, the set of lights (e.g., LEDs) 222A is switched or turned on (power supplied to the lights 222A), and this results in the lights 222A illuminating the inner or rear surface 214 of the now cloudy outer screen 212A with light 370. This causes light 380 to be emitted from the outer or outward-facing surface/side 213 of the outer screen 212A, which is perceived by the viewer via eye 307. In some embodiments, the lights 222A are white LEDs, and the light 380 is perceived as diffuse bright white light. Other embodiments use other light sources and/or other colored light 370. Because the switching between the first and second operating states of FIGS. 3A and 3B is at or above the flicker fusion rate (e.g., at a rate of 24 to 60 or more times per second), the viewer is only able to perceive the emitted light 380 and the outer screen 212A appears continuously opaque to the outside observer viewing the assembly 210A with their eye 307.

To protect the wearer's eye(s) 205, the shutter 230A (e.g., LC film(s)) is closed or placed in its darkened or opaque state by the controller. Hence, during the first operating state, the wearer of the mask or helmet (or other headgear) with the operating assembly 210A perceives no (or little) light from the assembly 210A. In practice, the interior space of the headgear would be dark during the light-emitting mode shown in FIG. 3A. Note, due to the rapid switching, the wearer does not perceive this dark state as it is overcome by the second operating state.

Particularly, FIG. 3B illustrates the special effects and vision assembly 210B operating the vision-enabling or second operating state/mode. In this mode, the outer screen 212B is switched from its cloudy or RP state into its clear or window state such that light 390 from the space outside the assembly 210B (exterior to the headgear that includes the assembly 210B) that strikes the outer surface 213 passes through the outer screen 212B. Concurrently, the lights 222B are turned or switched off (not powered by the controller) so that no glare or reflection is produced by the backlighting assembly. Hence, the light 390 from the exterior spaces passes without light from the lights 222B through the holes/openings in the support panel of the backlighting assembly.

Further, during the second operating state/mode of the assembly 210B, the controller acts to switch the shutter 230B into its open or clear state to allow the light 390 to also pass through the shutter 230B to the mask wearer's eye(s) 205. In this operating state, the wearer is able to perceive, via light 390 striking the eye 205, or directly view the exterior space without the need for additional equipment such as a camera and heads-up display. Instead, the assembly 210B provides a clear/transparent (which means clear to translucent in this description) window(s) or viewing port(s) to the exterior space. Again, the switching occurs so rapidly (e.g., faster than 24 Hz such as 45 to 60 Hz) that the wearer only perceives the light 390 such that to the wearer of the headgear with the assembly 210B the assembly 210B seems to be continuously operating in the second operating state (or vision-enabling or see-through mode). Note, the inside of the headgear is dark such that the outside observer via their eye(s) 307 does not see the wearer's face or eye(s) 205, and the dark state of FIG. 3B is "overcome" by the light-emitting state of FIG. 3A such that the outside observer perceives the light-emitting state to be continuous (no flicker when switching is rapid such as in the range of 24 to 60 Hz with some embodiments switching at 45 to 60 times per second).

Figure 4:
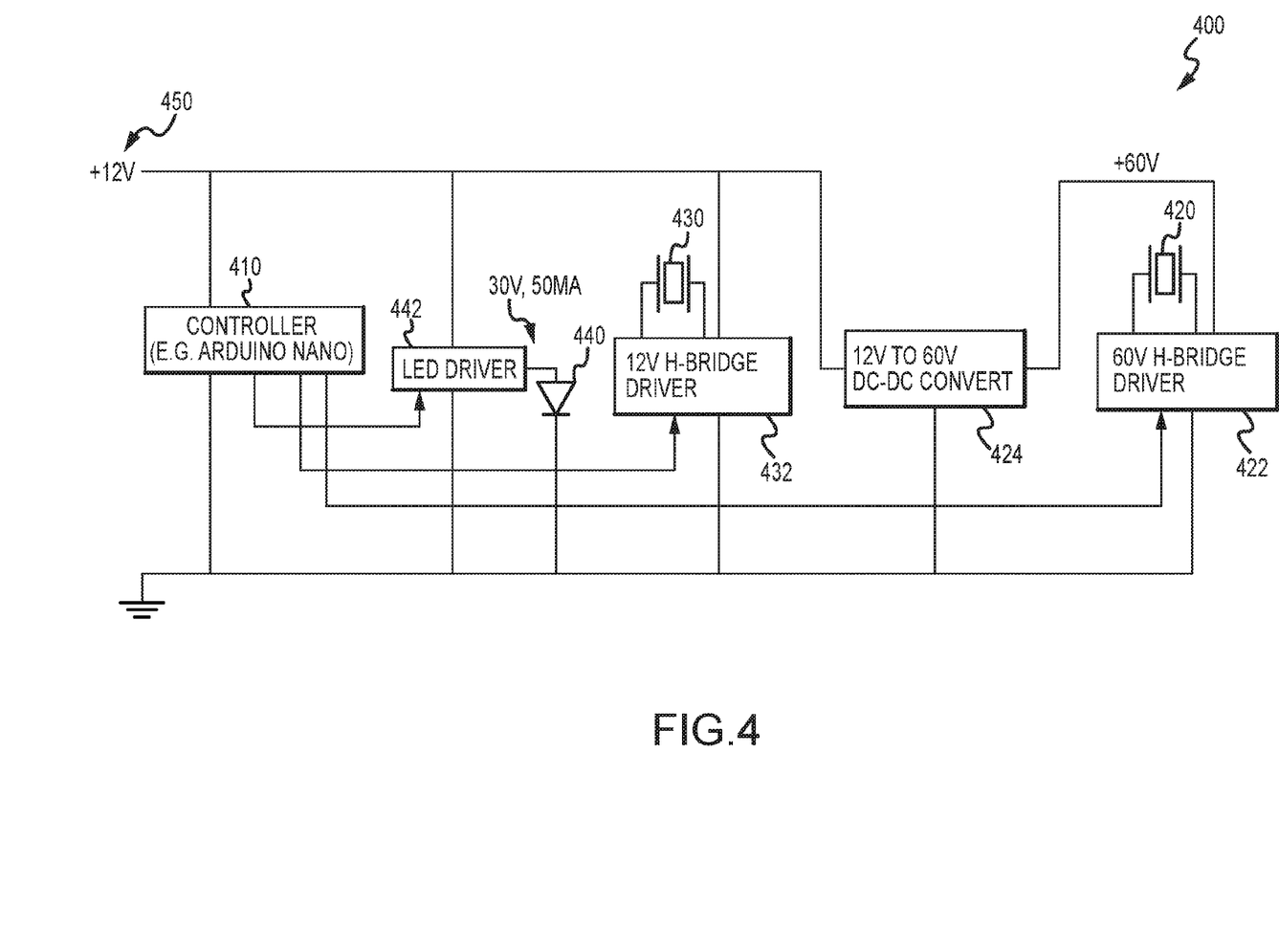
FIGS. 4-6 are schematics of three exemplary control circuits or assemblies (or more generally a "controller") for a special effects and vision assembly of the present description.
Figure 5:
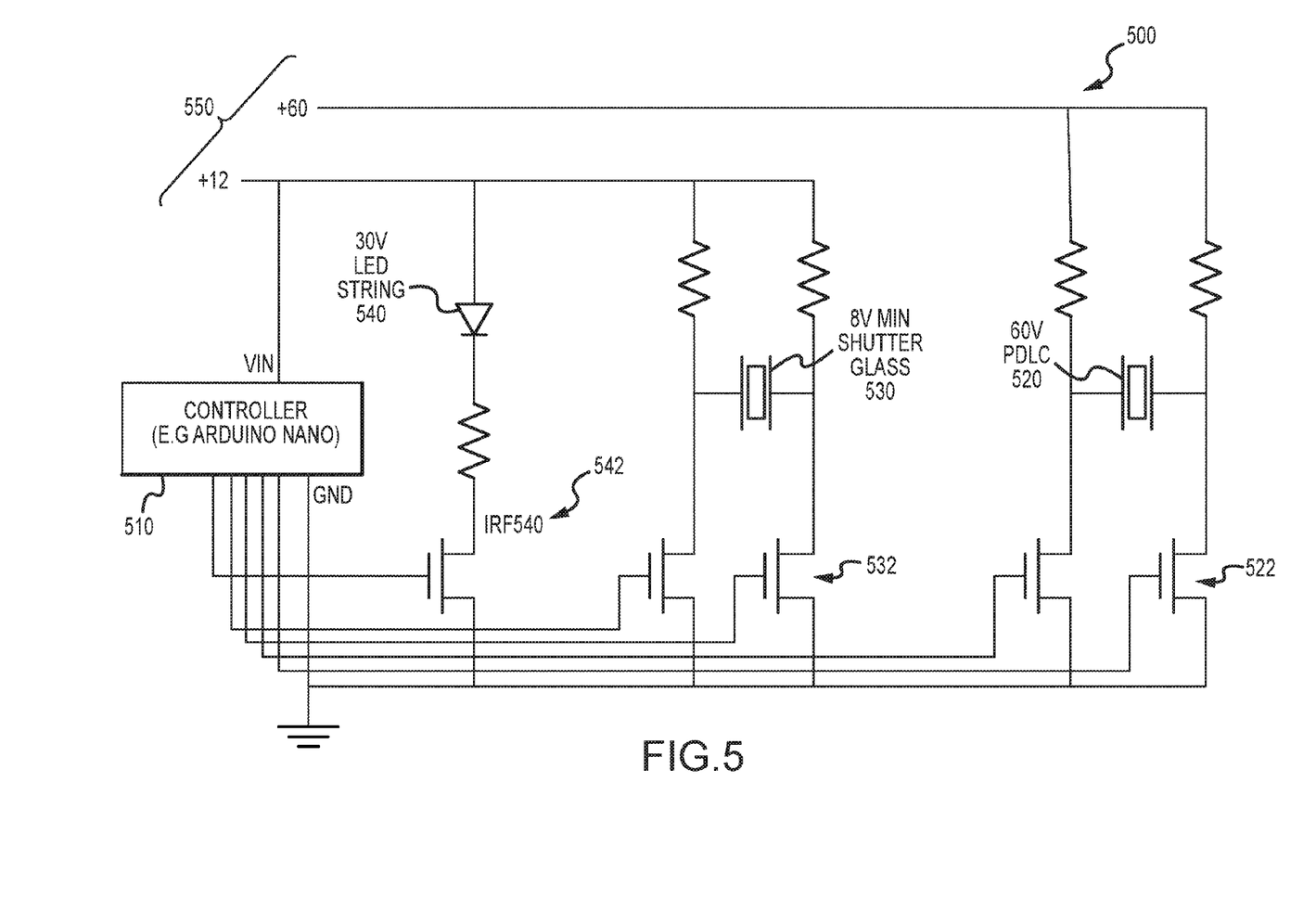
Figure 6:
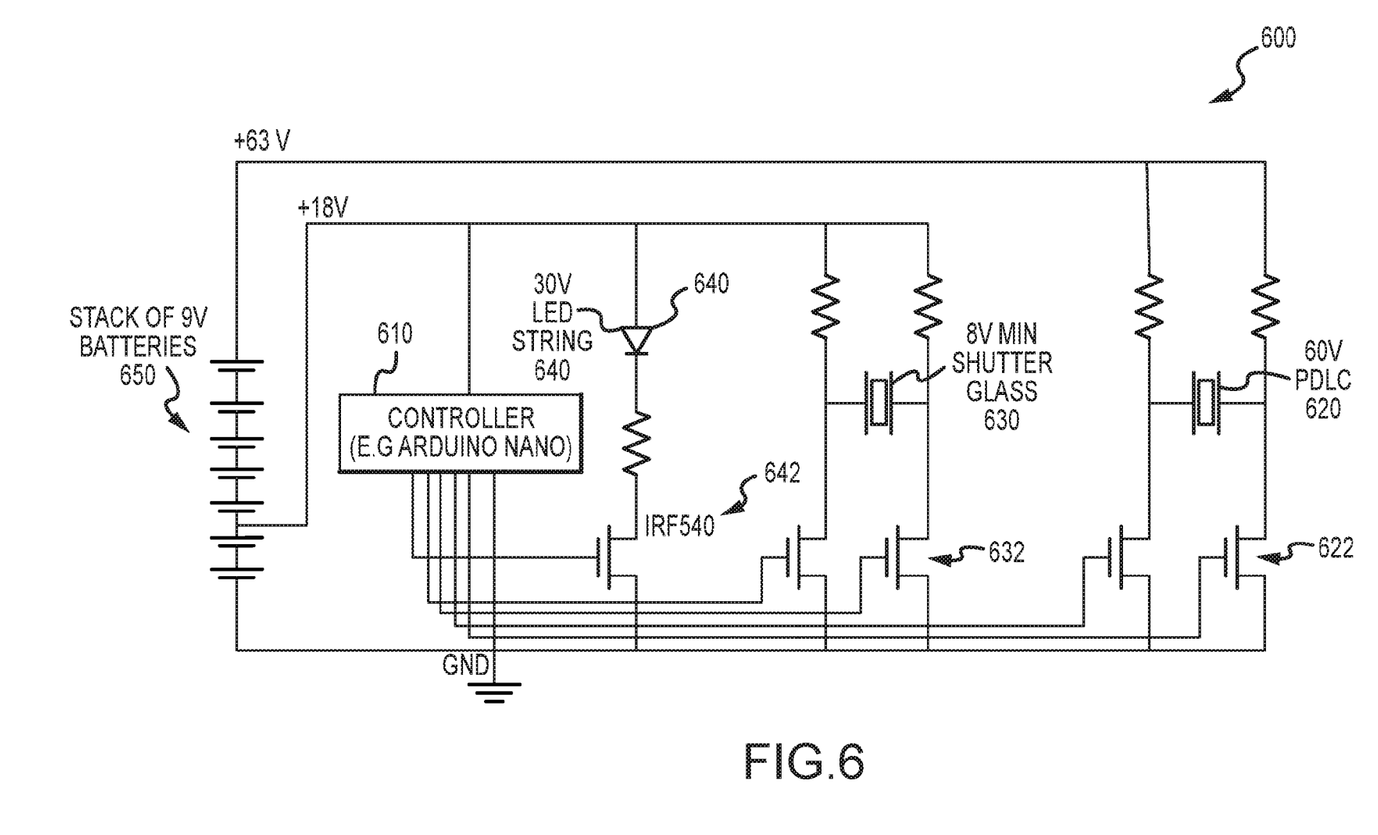

FIGS. 4-6 illustrate three implementations of optical assemblies 400, 500, and 600 including control circuitry (e.g., a controller, a power source, electrical circuitry, drivers, and the like) for providing the desired functionality described herein including rapid switching between the two operating states/modes. FIG. 4 shows an optical assembly 400 that includes an outer screen 420, a shutter 430, and a set or string of lights 440. In one embodiment, the outer screen 420 is provided using a sheet or piece of 60-Volt PDLC material, the shutter 430 is provided using 8-Volt minimum shutter glass, and the lights 540 are provided as a 30-Volt, 50 mAmp LED string (white).

The assembly 400 further includes a controller 410 (e.g., an Arduino Nano or the like) that switches the operation of these three components between a first operating state (light emitting) and a second operating state (see-through or vision-enabling), and this is achieved via control signals to a driver 422 (e.g., a 60-Volt H-bridge driver or the like) for the outer screen 420, a driver 432 (e.g., a 12-Volt H-bridge driver) for the shutter 530, and a light source driver 442 (e.g., an LED driver). The switching may be at a rate above the flicker fusion rate such as 30 to 60 Hz or the like. The assembly 400 also includes a power source 450 (e.g., a 12-Volt battery or the like) for providing power to the outer screen 420 (via driver 422 and converter 424 (if needed based on the power source and particular PDLC material utilized such as a 12-Volt to 60-Volt DC-DC converter)), to the shutter 430 (via driver 432), and to the lights 440 (via driver(s) 442).

FIG. 5 illustrates that the optical assembly 500 also includes a controller 510 for controlling (e.g., switching between the first and second operating states/modes) an outer screen 520, a shutter 530, and a string of lights 540 with drivers 522, 532, 542. The assembly 500 differs from the assembly 400 in that its power source 550 is not a single source (e.g., a 12-Volt battery) but is instead two sources in the form of a 12-Volt source and a 60-Volt source. The 12-Volt source powers the light string 540 and shutter 530 while the 60-Volt source is used to power the outer screen (e.g., film of PDLC material) 520 via operation of the switches/drivers 522, 532, 542 by the controller 510. As shown, the PDLC material 520 and shutter glass 530 are driven differentially in the assembly 500.

FIG. 6 illustrates an optical assembly 600 that has been successfully prototyped by the inventors. The assembly includes a 60-Volt PDLC sheet 620 to provide the switchable outer screen, an 8-Volt minimum shutter glass 530 providing the shutter (or shutter assembly), and a string of 30-Volt LEDs (white) providing the backlighting in assembly 600. A controller 610 in the form of an Arduino Nano was used to operate the components 620, 630, 640 in either a light-emitting mode (or first operating state/mode) or a vision-enabling or see-through mode (or second operating state/mode) in a rapidly (24 Hz or faster) switching manner.

This is achieved through the use of a set number of batteries in the power source 650 that took the form of a stack of seven 9-Volt batteries and operation of switches/drivers 622, 632, 642. Particularly, all seven 9-Volt batteries in power source 650 are used by the controller to power the 60-Volt PDLC screen 620 via switches/drivers to switch between a cloudy or RP operating mode and a clear or window operating mode. While two of the 9-Volt batteries of source 650 are used by the controller operating switch/driver 632 to power the shutter glass 630. The LED string 640 may be powered using four or more of the batteries of source 650 (with all seven being used in assembly 600) via operation of controller 610 of the switch/driver 642.

As discussed above, the controller 610 is configured to operate the sheet of PDLC 620 to be cloudy/translucent when the shutter glass 630 is closed and the LED string 640 is turned or powered on (e.g., to operate the assembly 600 in a first operating state). The controller 620 is further configured to operate the sheet of PDLC 620 to be clear/transparent when the shutter glass 630 is open and the LED string 640 is turned or powered off (e.g., to operate the assembly 600 in a second operating state). Further, the controller 610 is configured to switch back and forth between these two operating states over time in a very rapid manner to avoid flicker (e.g., at a rate over 24 Hz such as 30 to 60 Hz or 45 to 60 Hz or faster).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the optical assembly may further include a mask element between the lights (e.g., LEDs) and the inner or rear surface of the outer screen. This mask element may be configured to define or provide a design or pattern when it is illuminated by the lights (turned on during the first operating state or light-emitting mode) during operations of the optical assembly. This will result in a pattern being projected by the outer screen which is acting in this operating mode as a rear projection (RP) screen, and this pattern would be emitted via the outer or front surface of the outer screen and be visible to outside observers or viewers of headgear with the optical assembly. Due to the rapid switching of the shutter, the wearer of the headgear would not see this projected pattern.

I claim:

1. An apparatus for use as headgear providing visual effects, comprising:
   a shell with an interior space for receiving a person's head, wherein the shell includes at least one opening to the interior space; and
   an optical assembly mounted in the interior space of the shell, the optical assembly comprising:
      an outer screen switchable between a rear projection (RP) screen state and a transparent state;
      a backlighting assembly with a plurality of lights switchable between a first state with the lights powered on and a second state with the lights powered off; and
      a controller switching between operating the optical assembly in a first operating state with the outer screen in the RP screen state and the backlighting assembly in the first state to illuminate a rear surface of the outer screen with light from the lights and in a second operating state with the outer screen in the transparent state and the backlighting assembly in the second state to allow light to pass through the outer screen into the interior space of the shell,
   wherein the backlighting assembly further comprises an opaque support panel with a first surface facing the outer screen and a second surface facing the interior space of the shell, the lights being mounted on the first surface about the periphery of at least one opening in the support panel providing a pathway for the light passing through the outer panel to reach the interior space of the shell.

2. The apparatus of claim 1, wherein the switching by the controller is performed at a rate greater than 24 Hertz (Hz).

3. The apparatus of claim 1, wherein the outer screen comprises a film of polymer-dispersed liquid crystal (PDLC) material.

4. The apparatus of claim 1, wherein the lights each comprise a light emitting diode (LED).

5. The apparatus of claim 4, wherein the LEDs are white LEDs.

6. The apparatus of claim 1, wherein the optical assembly further comprises a shutter assembly, wherein the backlighting assembly is disposed between the shutter assembly and the outer screen, wherein the shutter assembly comprises a shutter switchable between a dark or opaque state and a transparent state, and wherein the controller operates the shutter in the dark or opaque state during the first operating state of the optical assembly and in the transparent state during the second operating state.

7. The apparatus of claim 6, wherein the shutter comprises a sheet of liquid crystal (LC) material.

8. A helmet, comprising:
a shell with at least one eye slit;
an outer screen positioned on the shell between the at least one eye slit and an interior space of the shell, wherein the outer screen comprises PDLC material;
a shutter switchable from a closed state blocking light and an open state transmitting light;
a backlighting assembly comprising a plurality of light sources switchable between a first state illuminating the outer screen with the light sources and a second state in which the light sources are powered off; and
a controller in a first operating mode operating the outer screen to be translucent, the shutter to be in the closed state, and the backlighting assembly in the first state and in a second operating mode operating the outer screen to be transparent, the shutter to be in the open state, and the backlighting assembly in the second state.

9. The helmet of claim 8, wherein the controller switches back and forth between the first and second operating modes at a rate greater than the flicker fusion rate.

10. The helmet of claim 8, wherein the light sources each comprises an LED mounted on a support panel on a surface facing the outer screen, wherein the support panel is opaque to light except through at least one opening or light passageway, and wherein the shutter extends over the at least one opening or light passageway.

11. The helmet of claim 10 wherein the LEDs are white LEDs.

12. The helmet of claim 8, wherein the shutter comprises a 3D glasses lens or a film of LC material.

13. The helmet of claim 8, wherein the backlighting assembly further comprises a mask element, whereby a pattern is projected onto the outer screen when the controller operates in the first operating mode.

14. A special effects and vision assembly for use in headgear, comprising:
a controller;
an outer screen switchable between being transparent to translucent to light;
a shutter switchable between being transparent to light and being substantially opaque to light;
a support panel disposed between the shutter and the outer screen;
a plurality of LEDs position on a surface of the support panel that faces the outer screen; and
a controller during a first operating phase operating the outer screen to be translucent, the shutter to be substantially opaque, and the LEDs to be on and emitting light onto the outer screen and during a second operating phase operating the outer screen to be transparent, the shutter to be transparent, and the LEDs to be off.

15. The assembly of claim 14, wherein the outer screen comprises one or more sheets of PDLC material.

16. The assembly of claim 14, wherein the shutter comprises a film of LC material.

17. The assembly of claim 14, wherein the support panel has a body formed of an opaque material, wherein the body has at least one hole or opening through which light may pass, and wherein the shutter extends over the at least one hole or opening.

18. The assembly of claim 14, wherein the controller, during operations of the assembly, switches between the first and second operating phases at a rate greater than about 24 Hz.

19. The assembly of claim 18, wherein the rate is in the range of 45 to 60 Hz.

20. An apparatus for use as headgear providing visual effects, comprising:
a shell with an interior space for receiving a person's head, wherein the shell includes at least one opening to the interior space; and
an optical assembly mounted in the interior space of the shell, the optical assembly comprising:
an outer screen switchable between a rear projection (RP) screen state and a transparent state;
a backlighting assembly with a plurality of lights switchable between a first state with the lights powered on and a second state with the lights powered off; and
a controller switching between operating the optical assembly in a first operating state with the outer screen in the RP screen state and the backlighting assembly in the first state to illuminate a rear surface of the outer screen with light from the lights and in a second operating state with the outer screen in the transparent state and the backlighting assembly in the second state to allow light to pass through the outer screen into the interior space of the shell,
wherein the optical assembly further comprises a shutter assembly,
wherein the backlighting assembly is disposed between the shutter assembly and the outer screen,
wherein the shutter assembly comprises a shutter switchable between a dark or opaque state and a transparent state, and
wherein the controller operates the shutter in the dark or opaque state during the first operating state of the optical assembly and in the transparent state during the second operating state.

21. The apparatus of claim 20, wherein the outer screen comprises a film of polymer-dispersed liquid crystal (PDLC) material.

22. The apparatus of claim 20, wherein the shutter comprises a sheet of liquid crystal (LC) material.

* * * * *